US012354516B2

(12) United States Patent
Lin et al.

(10) Patent No.: US 12,354,516 B2
(45) Date of Patent: Jul. 8, 2025

(54) DRIVING CIRCUIT

(71) Applicant: AUO Corporation, Hsinchu (TW)

(72) Inventors: Chih-Lung Lin, Hsinchu (TW); Yi-Chien Chen, Hsinchu (TW); Jui-Hung Chang, Hsinchu (TW); Ming-Yang Deng, Hsinchu (TW); Ming-Hung Chuang, Hsinchu (TW)

(73) Assignee: AUO CORPORATION, Hsinchu (TW)

( * ) Notice: Subject to any disclaimer, the term of this patent is extended or adjusted under 35 U.S.C. 154(b) by 0 days.

(21) Appl. No.: 18/818,657

(22) Filed: Aug. 29, 2024

(65) Prior Publication Data

US 2025/0111817 A1 Apr. 3, 2025

(30) Foreign Application Priority Data

Sep. 28, 2023 (TW) ................................ 112137583

(51) Int. Cl.
*G09G 3/20* (2006.01)

(52) U.S. Cl.
CPC ....... *G09G 3/2018* (2013.01); *G09G 2310/08* (2013.01); *G09G 2320/0233* (2013.01)

(58) Field of Classification Search
CPC ............. G09G 3/2018; G09G 2310/08; G09G 2320/0233; G09G 3/3233; G09G 3/32; G09G 2320/0626; G09G 2320/0633; H05B 45/10; H05B 45/325; H05B 45/33; H05B 45/37
See application file for complete search history.

(56) References Cited

U.S. PATENT DOCUMENTS

| | | | | |
|---|---|---|---|---|
| 2022/0101783 | A1* | 3/2022 | Han | G09G 3/32 |
| 2022/0114947 | A1* | 4/2022 | Chang | G09G 3/30 |
| 2024/0029630 | A1 | 1/2024 | Lin et al. | |
| 2025/0037659 | A1* | 1/2025 | Xu | G09G 3/3208 |

FOREIGN PATENT DOCUMENTS

| | | | | | |
|---|---|---|---|---|---|
| CN | 113077754 | A | | 7/2021 | |
| CN | 115862524 | A | * | 3/2023 | G09G 3/32 |
| KR | 20230099764 | A | * | 7/2023 | |
| TW | 202131758 | A | | 8/2021 | |
| TW | 202215404 | A | * | 4/2022 | G09G 3/30 |
| TW | 202420285 | A | | 5/2024 | |

* cited by examiner

*Primary Examiner* — Ricardo Osorio
(74) *Attorney, Agent, or Firm* — WPAT, PC

(57) ABSTRACT

A driving circuit includes a driving transistor, first to second capacitors and first to third switching transistors. The driving transistor is configured to control a driving current provided to a light emitting element to emit light. The first capacitor includes a first terminal coupled to a gate terminal of the driving transistor. The first switching transistor coupled between a second terminal of the first capacitor and a driving voltage terminal. The second switching transistor includes a first terminal coupled to a gate terminal of the first switching transistor and a second terminal coupled to a first reference voltage terminal. The third switching transistor coupled between a gate terminal of the second switching transistor and a second reference voltage terminal. The second capacitor includes a first terminal coupled to a gate terminal of the third switching transistor and a second configured to receive a sweep signal.

20 Claims, 12 Drawing Sheets

100

100

DRIVING CIRCUIT

CROSS-REFERENCE TO RELATED APPLICATION

This application claims priority to Taiwan Application Serial Number 112137583, filed Sep. 28, 2023, which is herein incorporated by reference in its entirety.

BACKGROUND

Field of Invention

The present invention relates to a driving circuit. More particularly, the present invention relates to a driving circuit capable for implementing grayscale dimming by pulse width modulation.

Description of Related Art

For current display technologies, if a transition time (such as, a rise/fall time) of a driving current, which is provided by a pixel circuit, for driving a light emitting element to emit light, is too long, it may result in a waveform distortion of the current at low grayscale condition. That is, the light emitting element cannot operate in a high-efficiency point. Further, in order to ensure that a driving transistor can operate in a saturation region and in consideration of the voltage across drain and source terminals of the driving transistor, there may dispose more transistors (such as, 4 transistors) on a path through which the driving current flows for driving the light emitting element in the pixel circuit, it may cause the increase in a voltage between driving voltage terminals, resulting the increase in power consumption.

SUMMARY

The present disclosure provides a driving circuit. The driving circuit includes a driving transistor, a first capacitor, a first switching transistor, a second switching transistor, a third switching transistor and a second capacitor. The driving transistor is electrically coupled between a first driving voltage terminal and a second driving voltage terminal, and the driving transistor is configured to control a driving current provided to a light emitting element. A first terminal of the first capacitor is electrically coupled to a gate terminal of the driving transistor. A first terminal of the first switching transistor is electrically coupled to a first terminal of the driving transistor. A second terminal of the first switching transistor is electrically coupled to a second terminal of the first capacitor. A first terminal of the second switching transistor is electrically coupled to a gate terminal of the first switching transistor. A second terminal of the second switching transistor is electrically coupled a first reference voltage terminal. The third switching transistor is electrically coupled between a gate terminal of the second switching transistor and a second reference voltage terminal. A first terminal of the second capacitor is electrically coupled to a gate terminal of the third switching transistor. A second terminal of the second capacitor is configured to receive a sweep signal.

The present disclosure provides a driving circuit. The driving circuit includes a driving transistor, a first capacitor, a first switching transistor, a second switching transistor, a third switching transistor and a second capacitor. The driving transistor is electrically coupled between a first driving voltage terminal and a second driving voltage terminal, and the driving transistor is configured to control a driving current provided to a light emitting element. The first switching transistor and the first capacitor are electrically connected in series between the first driving voltage terminal and a gate terminal of the driving transistor. A first terminal of the second switching transistor is electrically coupled to a gate terminal of the first switching transistor. A second terminal of the second switching transistor is electrically coupled a first reference voltage terminal. The third switching transistor is electrically coupled between a gate terminal of the second switching transistor and a second reference voltage terminal. A first terminal of the second capacitor is electrically coupled to a gate terminal of the third switching transistor. A second terminal of the second capacitor is configured to receive a sweep signal.

The present disclosure provides a driving circuit. The driving circuit includes a driving transistor, a first capacitor, a first switching transistor, a second switching transistor, a third switching transistor and a second capacitor. The driving transistor is electrically coupled between a first driving voltage terminal and a second driving voltage terminal, and the driving transistor is configured to control a driving current provided to a light emitting element. A first terminal of the first capacitor is electrically coupled to a gate terminal of the driving transistor. A first switching transistor is electrically coupled between a second terminal of the first capacitor and the first driving voltage terminal. A second switching transistor is electrically coupled between a gate terminal of the first switching transistor and a first reference voltage terminal. A third switching transistor is electrically coupled between a gate terminal of the second switching transistor and a second reference voltage terminal. A first terminal of the second capacitor is electrically coupled to a gate terminal of the third switching transistor, and a second terminal of the third switching transistor is configured to receive a sweep signal.

Summary, the driving circuit of the present disclosure is based on two-stage path controlled by second switching transistor and third transistor to turn on the first switching transistor, in order to reduce the transition time of driving current by fast rising mechanism, as such the intensity of grayscale can be controlled precisely.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
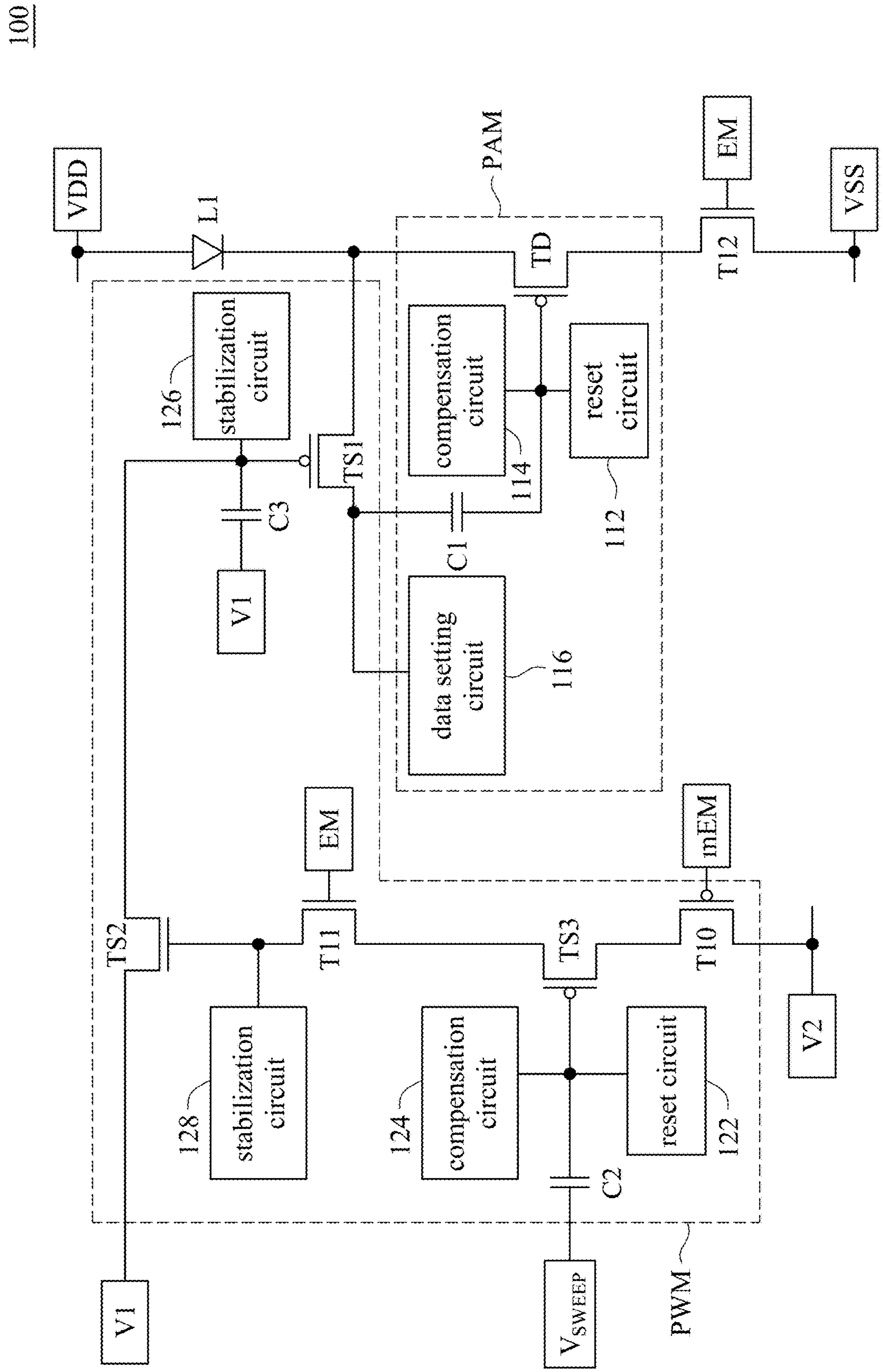
FIG. 1 depicts a schematic diagram of a driving circuit according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of elements with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the description herein and throughout the claims that follow, the terms "comprise" or "comprising," "include" or "including," "have" or "having," "contain" or "containing" and the like used herein are to be understood to be open-ended, i.e., to mean including but not limited to.

A description is provided with reference to FIG. 1. FIG. 1 depicts a schematic diagram of a driving circuit 100 according to some embodiments of the present disclosure. In some embodiments, the driving circuit 100 is a driving circuit included in a pixel array of a micro light emitting diode display. As shown in FIG. 1, the driving circuit 100 includes a pulse amplitude modulation circuit PAM, a pulse width modulation circuit PWM, a light emitting element L1 and transistors T10-T12. In some embodiments, the light emitting element L1 is a micro-light emitting diode, and the light emitting element L1 is electrically coupled to a path through which a driving current flows from driving voltage terminal VDD to the driving voltage terminal VSS, in order to emit light according to the driving current. In some embodiments, the transistor T12 is electrically coupled to the aforesaid path for the transmission of the driving current and the transistor T12 is coupled between the pulse amplitude modulation circuit PAM and the driving voltage terminal VSS. In some embodiments, by applying the emission control signal EM to the gate terminal of the transistor T12, the conduction status of a path from the pulse amplitude modulation circuit PAM to the driving voltage terminal VSS can be controlled.

In some embodiments, the pulse amplitude modulation circuit PAM is electrically coupled to a path for the transmission of the driving current which flows through the light emitting element L1, in order to control the pulse amplitude of the said driving current. In some embodiments, the pulse width modulation circuit PWM is electrically coupled to the pulse amplitude modulation circuit PAM, and the pulse width modulation circuit PWM is configured to determine a point in time to close the path for the transmission of the driving current, thereby controlling the pulse width of the said driving current, in order to perform the grayscale control. In some embodiments, the driving circuit 100 is in an off state first and then turned on (a point in time to close the path for the transmission of the driving current is determined by the pulse width modulation circuit PWM) in an emission period, it can avoid the light leakage phenomenon, thereby increasing the display's contrast. In some embodiments, the driving circuit 100 of the present disclosure is based on the pulse width modulation manner which can operate the light emitting element L1 at the best emission efficiency point at all grayscales.

In some embodiments, the pulse amplitude modulation circuit PAM includes a driving transistor TD and a capacitor C1. In some embodiments, the driving transistor TD is electrically coupled between driving voltage terminals VDD and VSS, and the driving transistor TD is configured to control the driving current providing to the light emitting element L1. In some embodiments, a gate terminal of the driving transistor TD is electrically coupled to the capacitor C1, as such the amplitude of the driving current provided to the light emitting element L1 is controlled according to the voltage stored on the capacitor C1.

In some embodiments, the pulse width modulation circuit PWM includes switching transistors TS1, TS2 and TS3 and a capacitor C2. In some embodiments, the switching transistor TS1 and the capacitor C1 included in the pulse amplitude modulation are electrically connected in series between a first terminal and a gate terminal of the driving transistor TD. In some embodiments, the switching transistor TS1 closes a path through which a current flows from the driving voltage terminal VDD to the capacitor C1, as such a voltage at the gate terminal of the driving transistor TD is changed by capacitive coupling effect, thereby turning on the driving transistor TD.

To be noted that, the driving circuit 100 of the present disclosure utilizes two-stage path to turn on the switching transistor TS1, in order to reduce the rise time of driving current by fast rising mechanism, as such the intensity of grayscale can be controlled precisely. How to turn on the switching transistor TS1 by the two-stage path will be discussed in the following embodiments.

In some embodiments, the switching transistor TS2 is electrically coupled between the gate terminal of the switching transistor TS1 and a reference voltage terminal V1, and the switching transistor TS2 is configured to control a point in time to closed a path through which a current flows from the gate terminal of the switching transistor TS1 to the reference voltage terminal V1.

In some embodiments, the switching transistor TS3 is electrically coupled between a gate terminal of the switching transistor TS2 and a reference voltage terminal V2, and the switching transistor TS2 is configured to control a point in time to closed a path through which a current flows from the reference voltage terminal V2 to the gate terminal of the switching transistor TS2.

In some embodiments, a first terminal of the capacitor C2 is electrically coupled to a gate terminal of the switching transistor TS3, and a second terminal of the capacitor C2 is configured to receive a sweep signal $V_{SWEEP}$, in order to change a voltage at the gate terminal of the switching transistor TS3 by the capacitive coupling effect, as such the switching transistor TS3 is turned on according to a variation of the voltage of the sweep signal $V_{SWEEP}$, thereby transmitting the voltage of the reference voltage terminal V2 to the gate terminal of the switching transistor TS2.

In some embodiments, a voltage of the sweep signal $V_{SWEEP}$ is linearly decreased in a scan period (sweep time), thereby changing a voltage at the gate terminal of the switching transistor TS3 by the capacitor C2, in order to turn on the switching transistor TS3. In some embodiments, a voltage of the sweep signal $V_{SWEEP}$ returns to an initial voltage at the end of the scan period, thereby performing multi-scan operation in the following periods. In some embodiments, when the switching transistor TS3 is turned on, a voltage of the reference voltage terminal V2 is transmitted through the switching transistor TS3 to the gate terminal of the switching transistor TS2 to turn on the switching transistor TS2. In some embodiments, when the switching transistor TS2 is turned on, a voltage of the reference voltage terminal V1 is transmitted through the switching transistor TS2 to the gate terminal of the switching transistor TS1. In some embodiments, a voltage of the reference voltage terminal V2 is greater than a voltage of the reference voltage terminal V1. In some embodiments, a voltage of the reference voltage terminal V2 is greater than a voltage of the reference voltage terminal V1 and the voltage of the reference voltage terminal V2 is less than a voltage of the driving voltage terminal VDD. As a result, by turning on the switching transistor TS3 to fast charge the gate terminal of the switching transistor TS2, the switching transistor TS2 rapidly reaches a linear region, as such the falling rate of the voltage at the gate terminal of the switching transistor TS1 is increased, thereby reducing the rise time of the driving current, resulting in accuracy control for light intensity in grayscale.

In some embodiments, the sweep signal $V_{SWEEP}$ and the emission control signal EM are global scan signals, each of them scans all of the scan lines included in the pixel array at the same time. In the other embodiments, the sweep signal $V_{SWEEP}$ and the emission control signal EM are progressive scan signals, each of them progressively scans the scan lines included in the pixel array. Therefore, it is not intend to limit the present disclosure.

In some embodiments, the switching transistor TS1 is configured to close a path through which a current flows from the driving voltage terminal VDD to the capacitor C1 according to the voltage of the reference voltage terminal V1, in order to change a voltage at the gate terminal of the driving transistor TD by capacitive coupling effect, thereby turning on the driving transistor TD. As a result, the pulse width modulation circuit PWM is capable to control a point of time to turn on the driving transistor TD of the pulse amplitude modulation circuit PAM, in order to control the pulse width of the driving current flowing through the light emitting element L1. Furthermore, the number of transistors (such as, the driving transistor TD and the transistor T12) required on a path for the transmission of the driving current is reduced in the driving circuit 100 of the present disclosure, it can decrease a required voltage between the driving voltage terminals VDD and VSS, thereby reducing the power consumption during the circuit operation.

In some embodiments, the pulse amplitude modulation circuit PAM includes a driving transistor TD, a capacitor C1, a reset circuit 112, a compensation circuit 114 and a data setting circuit 116. In some embodiments, the reset circuit 112 is electrically coupled to a gate terminal of the driving transistor TD, and the reset circuit 112 is configured to reset the voltage at the gate terminal of the driving transistor TD. In some embodiments, the compensation circuit 114 is electrically coupled to the gate terminal of the driving transistor TD, and the compensation circuit 114 is configured to compensate a threshold voltage of the driving transistor TD. In some embodiments, two terminal of the capacitor C1 are electrically coupled to the data setting circuit 116 and the gate terminal of the driving transistor TD, respectively, and the capacitor C1 is configured to transmit the information of the data signal transmitted by the data setting circuit 116 to the gate terminal of the driving transistor TD.

In some embodiments, the pulse width modulation circuit PWM includes switching transistors TS1~TS3, capacitors C2 and C3, transistors T10-T11, a reset circuit 122, a compensation circuit 124, stabilization circuits 126 and 128. In some embodiments, the capacitor C3 is electrically coupled between a reference voltage terminal V1 and a gate terminal of the switching transistor TS1. In some embodiments, the stabilization circuit 126 is electrically coupled to the gate terminal of the switching transistor TS1, and the stabilization circuit 126 is configured to stable a voltage at the gate terminal of the switching transistor TS1. In some embodiments, the transistors T11 and T10 and the switching transistor TS3 are electrically coupled to a path through which a current flows from the reference voltage terminal V2 to a gate terminal of the switching transistor TS2. In some embodiments, the compensation circuit 124 is electrically coupled to a gate terminal of the switching transistor TS3, and the compensation circuit 124 is configured to compensate a threshold voltage of the switching transistor TS3. In some embodiments, the reset circuit 122 is electrically coupled to a gate terminal of the switching transistor TS3, and the reset circuit 122 is configured to reset a voltage at the gate terminal of the switching transistor TS3. In some embodiments, the stabilization circuit 128 is electrically coupled to the gate terminal of the switching transistor TS2, and the stabilization circuit 128 is configured to stable a voltage at the gate terminal of the switching transistor TS2. In some embodiments, gate terminals of the transistor T11 and T12 are configured to receive an emission control signal EM, in order to turn on in stabilization periods and emission periods. In some embodiments, a gate terminal of the transistor T10 is configured to receive a multi-emission control signal mEM, in order to turn off in the stabilization periods and to turn on in the emission periods.

Figure 2:
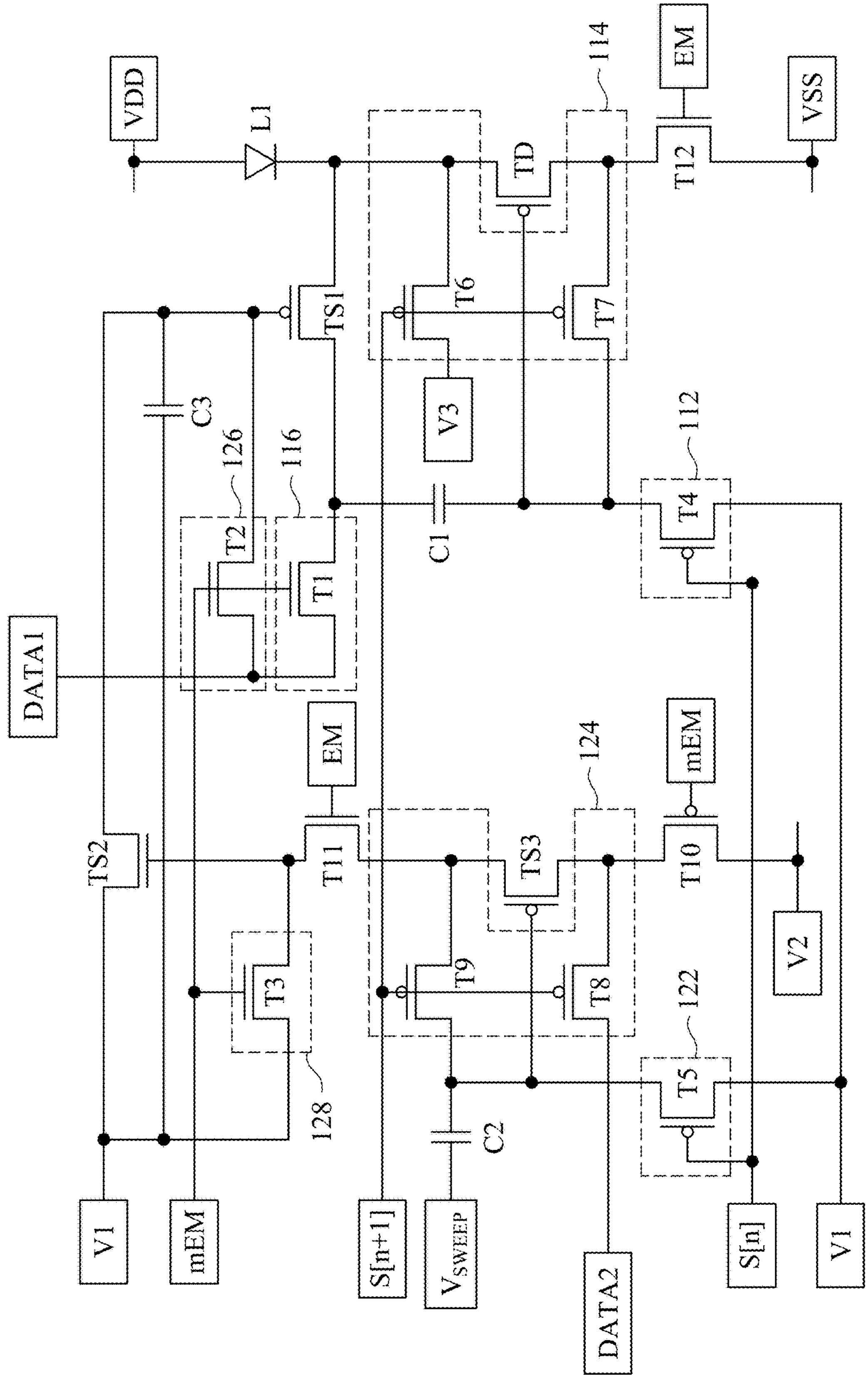
FIG. 2 depicts a schematic diagram of a driving circuit according to an embodiment of the present disclosure.

A description is provided with reference to FIG. 1 and FIG. 2. FIG. 2 depicts a schematic diagram of a driving circuit 100 according to an embodiment of the present disclosure. In some embodiments, the reset circuit 112 of the pulse amplitude modulation circuit PAM includes a transistor T4, and the reset circuit 122 of the pulse width modulation circuit PWM includes a transistor T5. In some embodiments, a first terminal of the transistor T4 is electrically coupled to the gate terminal of the driving transistor TD, and a second terminal of the transistor T4 is electrically coupled to the reference voltage terminal V1. In some embodiments, a first terminal of the transistor T5 is electrically coupled to the gate terminal of the switching transistor TS3, and a second terminal of the transistor T5 is electrically coupled to the reference voltage terminal V1. In some embodiments, gate terminals of the transistors T4 and T5 are configured to receive a control signal S[n].

In some embodiments, the compensation circuit 114 of the pulse amplitude modulation circuit PAM includes transistors T6-T7, and the compensation circuit 124 of the pulse width modulation circuit PWM includes transistors T8-T9. In some embodiments, a first terminal of the transistor T6 is electrically coupled to a first terminal of the driving transistor TD, and a second terminal of the transistor T6 is electrically coupled to s reference voltage terminal V3. In some embodiments, a first terminal of the transistor T7 is electrically coupled to a second terminal of the driving transistor TD, and a second terminal of the transistor T7 is electrically coupled to the gate terminal of the driving transistor TD. In some embodiments, a first terminal of the transistor T8 is electrically coupled to a second terminal of the switching transistor TS3, and a second terminal of the transistor T8 is configured to receive a e data signal DATA2. In some embodiments, a data voltage of the data signal DATA2 provided to the driving circuit 100 depends on the grayscale level. In some embodiments, a first terminal of the transistor T9 is electrically coupled to a first terminal of the switching transistor TS3, and a second terminal of the transistor T9 is electrically coupled to the gate terminal of the switching transistor TS3. In some embodiments, gate terminals of the transistors T6-T9 are configured to receive a control signal S[n+1].

In some embodiments, the data setting circuit 116 of the pulse amplitude modulation circuit PAM includes a transistor T1. In some embodiments, a first terminal of the transistor T1 is electrically coupled to a second terminal of the capacitor C1, and a first terminal of the capacitor C1 is electrically coupled to the gate terminal of the driving transistor TD. In some embodiments, a second terminal of the transistor T1 is configured to receive a data signal DATA1, and a gate terminal of the transistor T1 is configured to receive a multi-emission control signal mEM. In some embodiments, a data voltage of the data signal DATA1 provided to the driving circuit 100 depends on a subpixel (such as, a red, green or blue subpixel) corresponding to the driving circuit 100.

In some embodiments, the stabilization circuit 126 of the pulse width modulation circuit PWM includes a transistor T2. In some embodiments, a stabilization circuit 128 includes a transistor T3. In some embodiments, a first terminal of the transistor T2 is electrically coupled to the gate terminal of the switching transistor TS1, and a second terminal of the transistor T2 is configured to receive the data signal DATA1. In some embodiments, a first terminal of the transistor T3 is electrically coupled to the gate terminal of the switching transistor TS2, and a second terminal of the transistor T3 is electrically coupled to the reference voltage terminal V1. In some embodiments, gate terminals of the transistors T2 and T3 are configured to receive a multi-emission control signal mEM.

In some embodiments, a first terminal of the transistor T11 is electrically coupled the gate terminal of the switching transistor TS2, and a second terminal of the transistor T11 is electrically coupled to a first terminal of the switching transistor TS3. A gate terminal of the transistor T11 is configured to receive the emission control signal EM.

In some embodiments, a first terminal of the transistor T10 is electrically coupled to a second terminal of the switching transistor TS3, and a second terminal of the transistor T10 is electrically coupled to the reference voltage terminal V2. A gate terminal of the transistor T10 is configured to receive a multi-emission control signal mEM.

In some embodiments, a first terminal of the light emitting element L1 is electrically coupled to the driving voltage terminal VDD, and a second terminal of light emitting element L1 is electrically coupled to the first terminal of the driving transistor TD. In some embodiments, a first terminal of the transistor T12 is electrically coupled to a second terminal of the driving transistor TD, and a second terminal of the transistor T12 is electrically coupled to the driving voltage terminal VSS. In some embodiments, a gate terminal of the transistor T12 is configured to receive the emission control signal EM.

In some embodiments, each of the aforesaid transistors includes a first terminal, a second terminal and a gate terminal. If a first terminal of a transistor is a drain/source terminal, a second terminal of the transistor is a source/drain terminal. And, each of the aforesaid capacitors includes a first terminal and a second terminal. If a first terminal of a capacitor is an anode/cathode, a second terminal of a capacitor is a cathode/anode.

Figure 3:
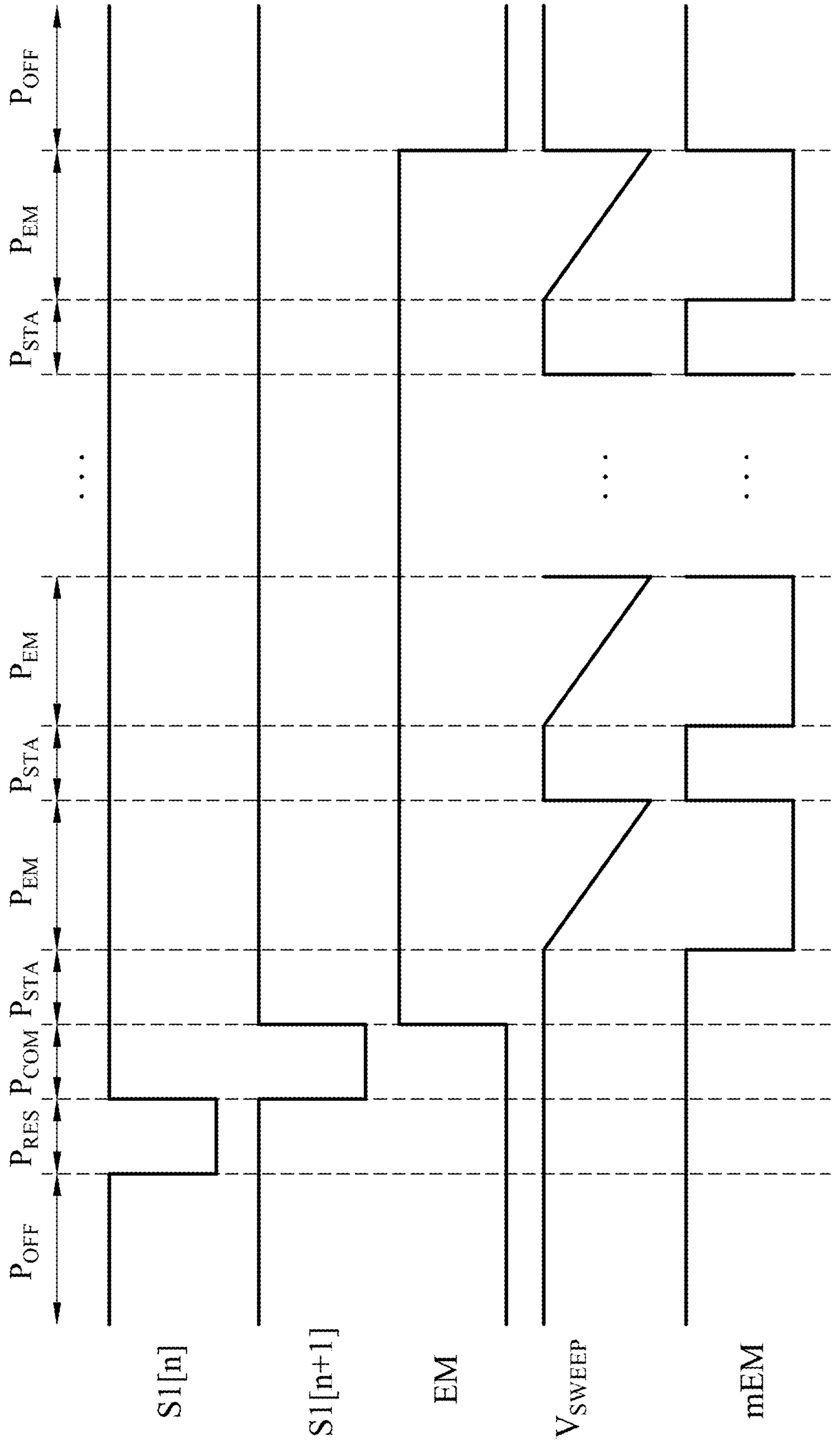
FIG. 3 depicts a timing diagram of control signals according to an embodiment of the present disclosure.

A description is provided with reference to FIG. 3. FIG. 3 depicts a timing diagram of control signals according to an embodiment of the present disclosure. As shown in FIG. 3, a display cycle in the control timing of the driving circuit 100 can be divided into five types of periods, which respectively are a reset period $P_{RES}$, a compensation period $P_{COM}$, a stabilization period $P_{STA}$, an emission period $P_{EM}$ and an off period $P_{OFF}$. In some embodiments, a time length of each of the reset period $P_{RES}$ and the compensation period $P_{COM}$ is a Horizontal Scan time. In some embodiments, a time length of the emission period $P_{EM}$ is twice the horizontal scan time. To be noted that, the time lengths of these periods are taken as example, it is not intended to limit the present disclosure.

Figure 4A:
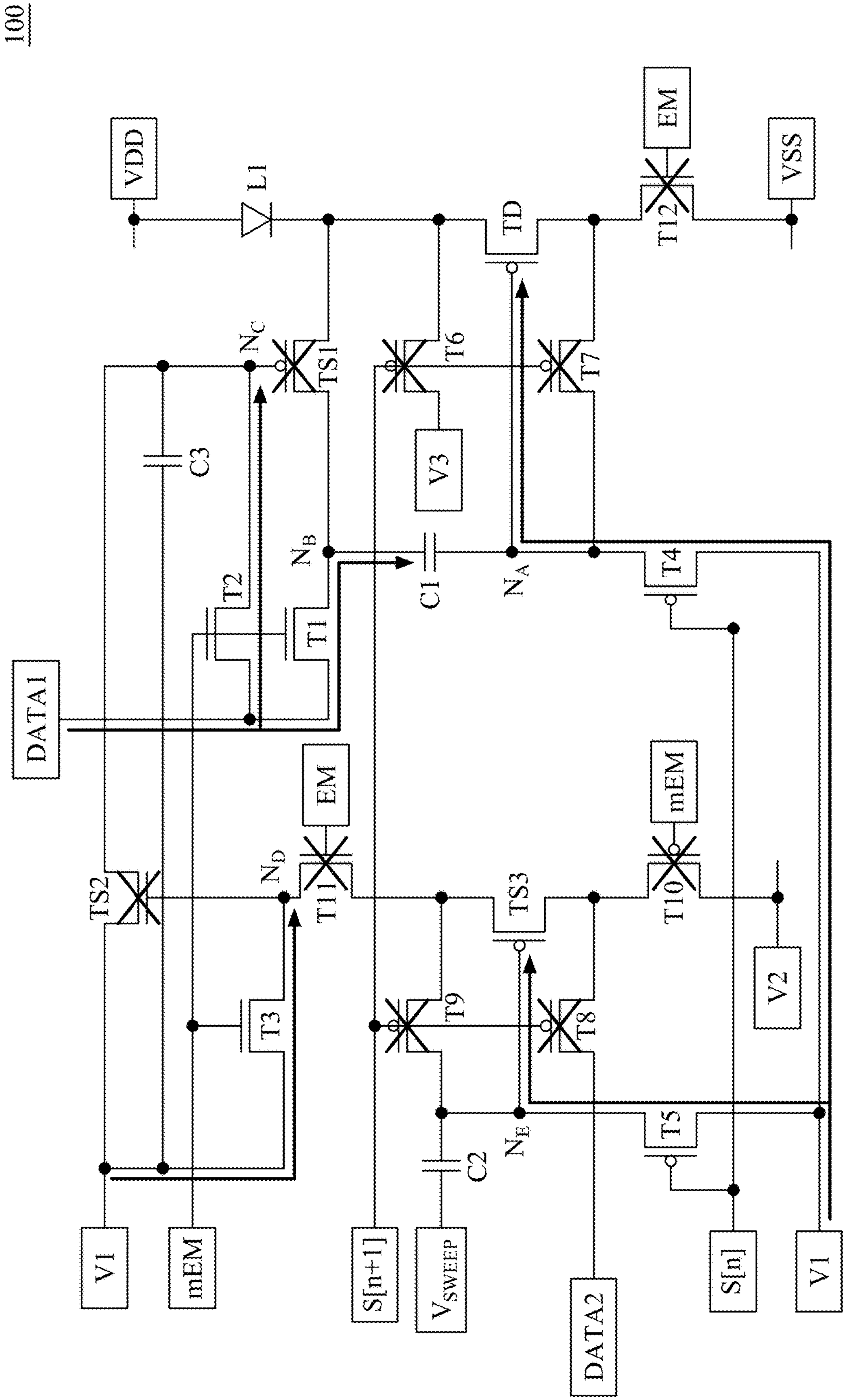
FIG. 4A depicts a schematic diagram of a driving circuit operates in a reset period according to an embodiment of the present disclosure.
Figure 4B:
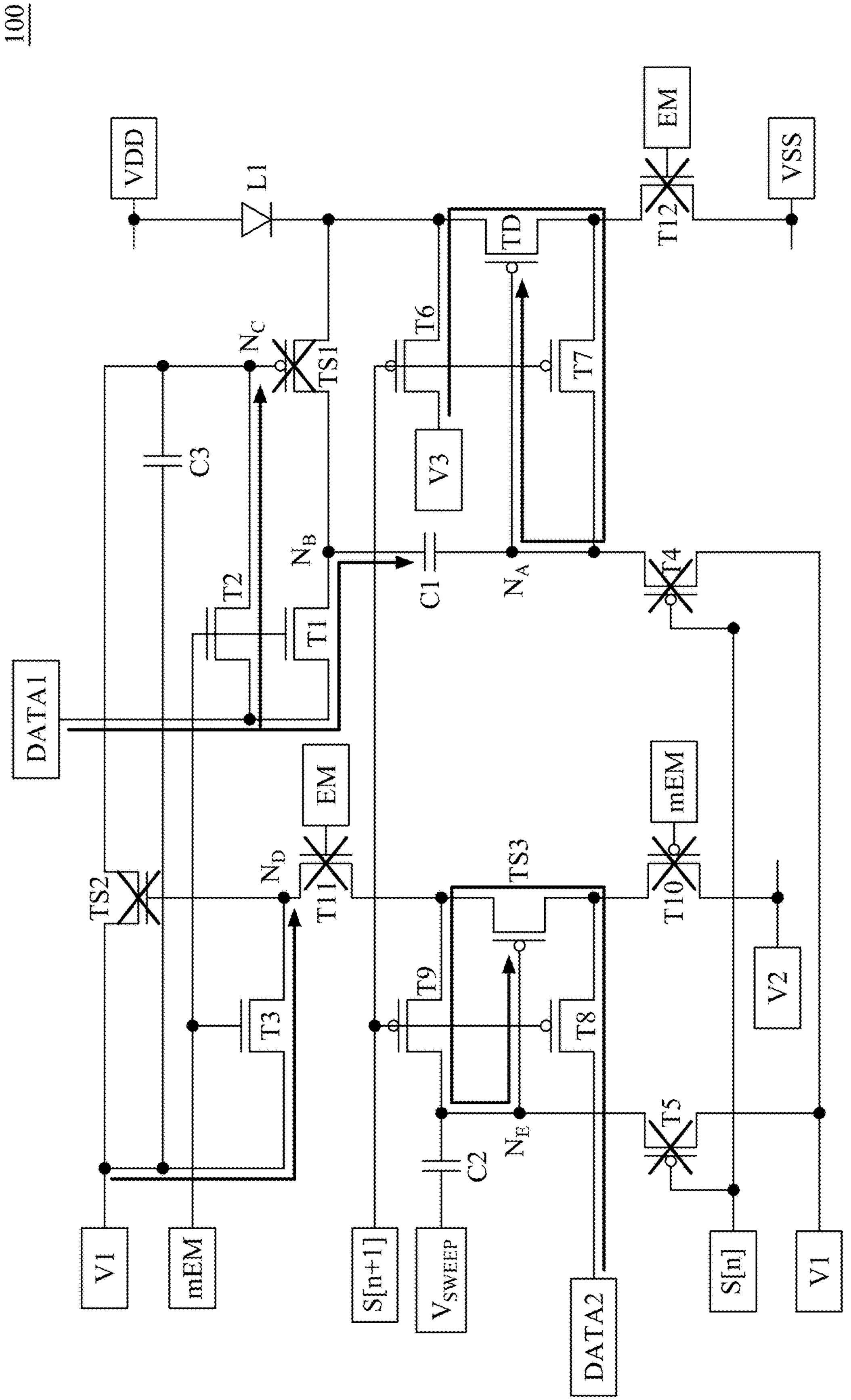
FIG. 4B depicts a schematic diagram of a driving circuit operates in a compensation period according to an embodiment of the present disclosure.
Figure 4C:
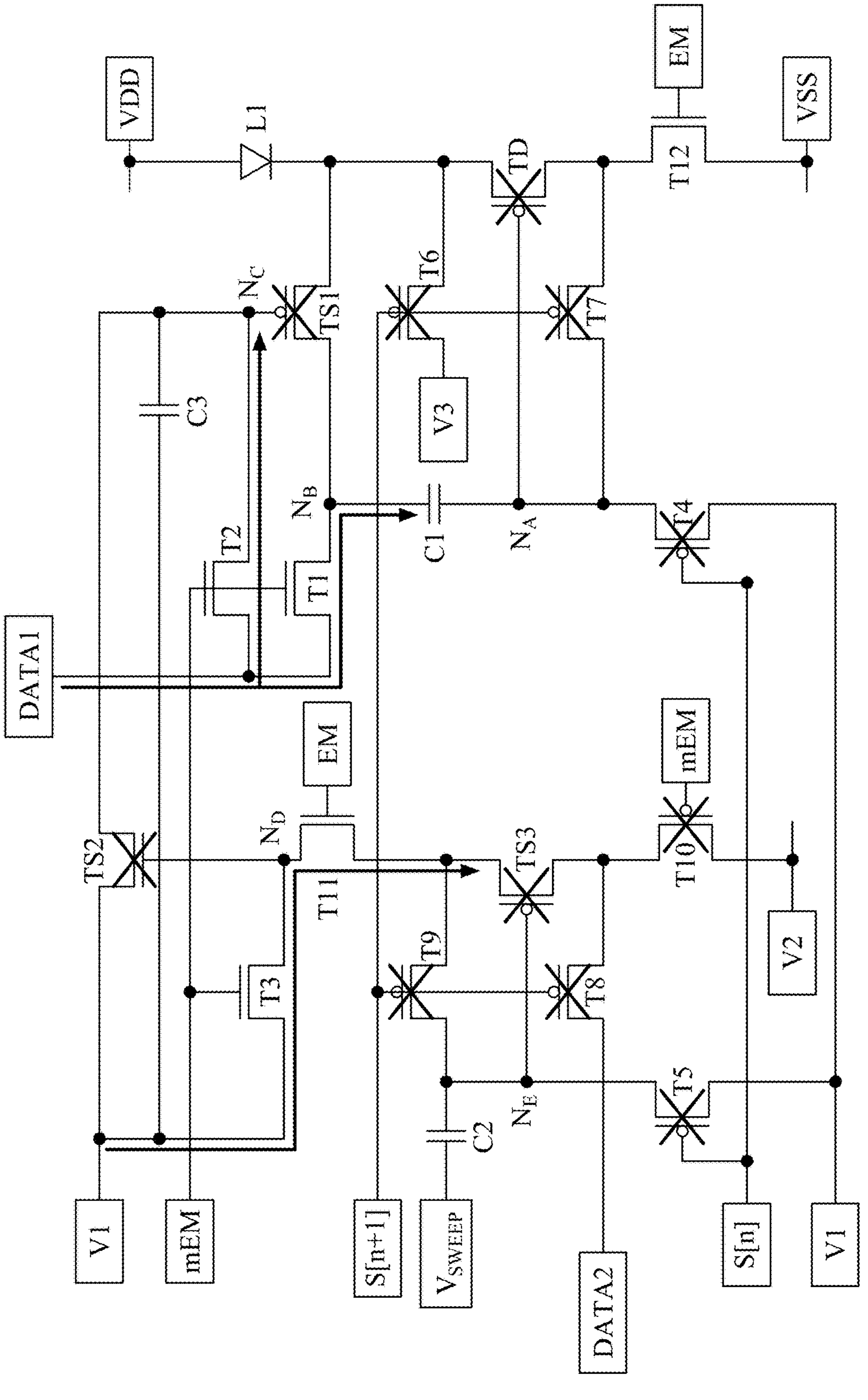
FIG. 4C depicts a schematic diagram of a driving circuit operates in a stabilization period according to an embodiment of the present disclosure.
Figure 4D:
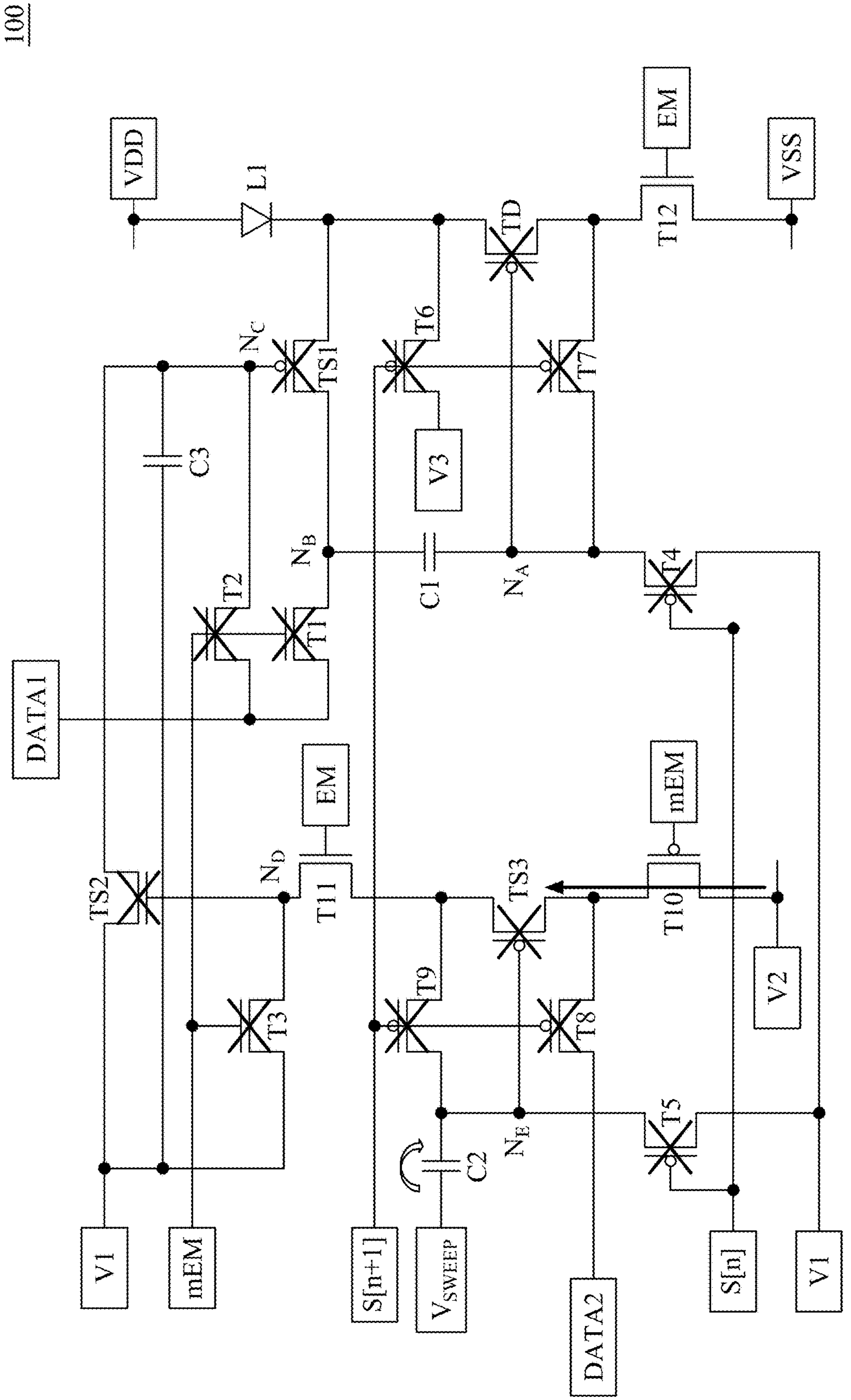
FIG. 4D and FIG. 4E depict schematic diagrams of a driving circuit operates in an emission period according to an embodiment of the present disclosure.
Figure 4E:
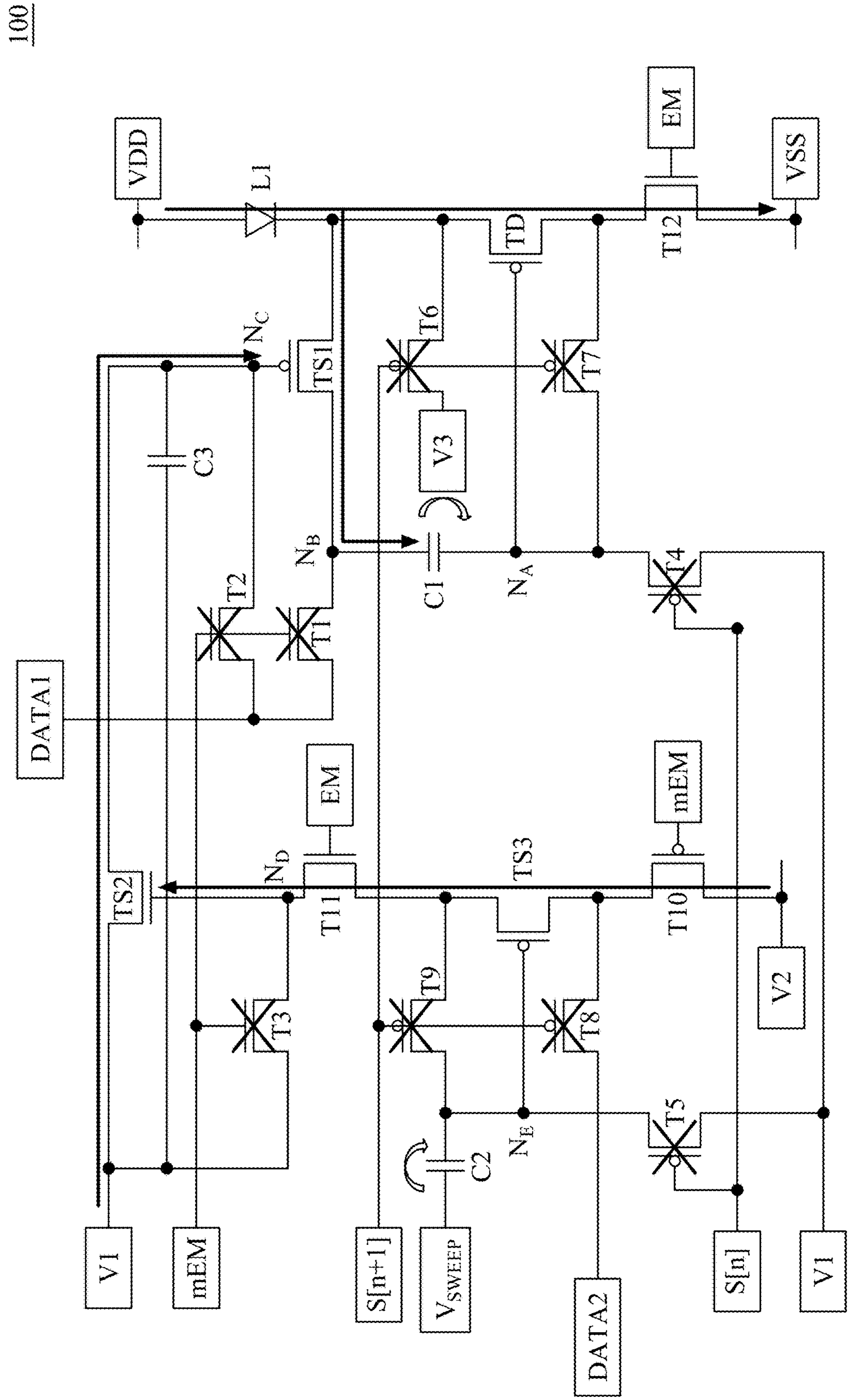
Figure 4F:
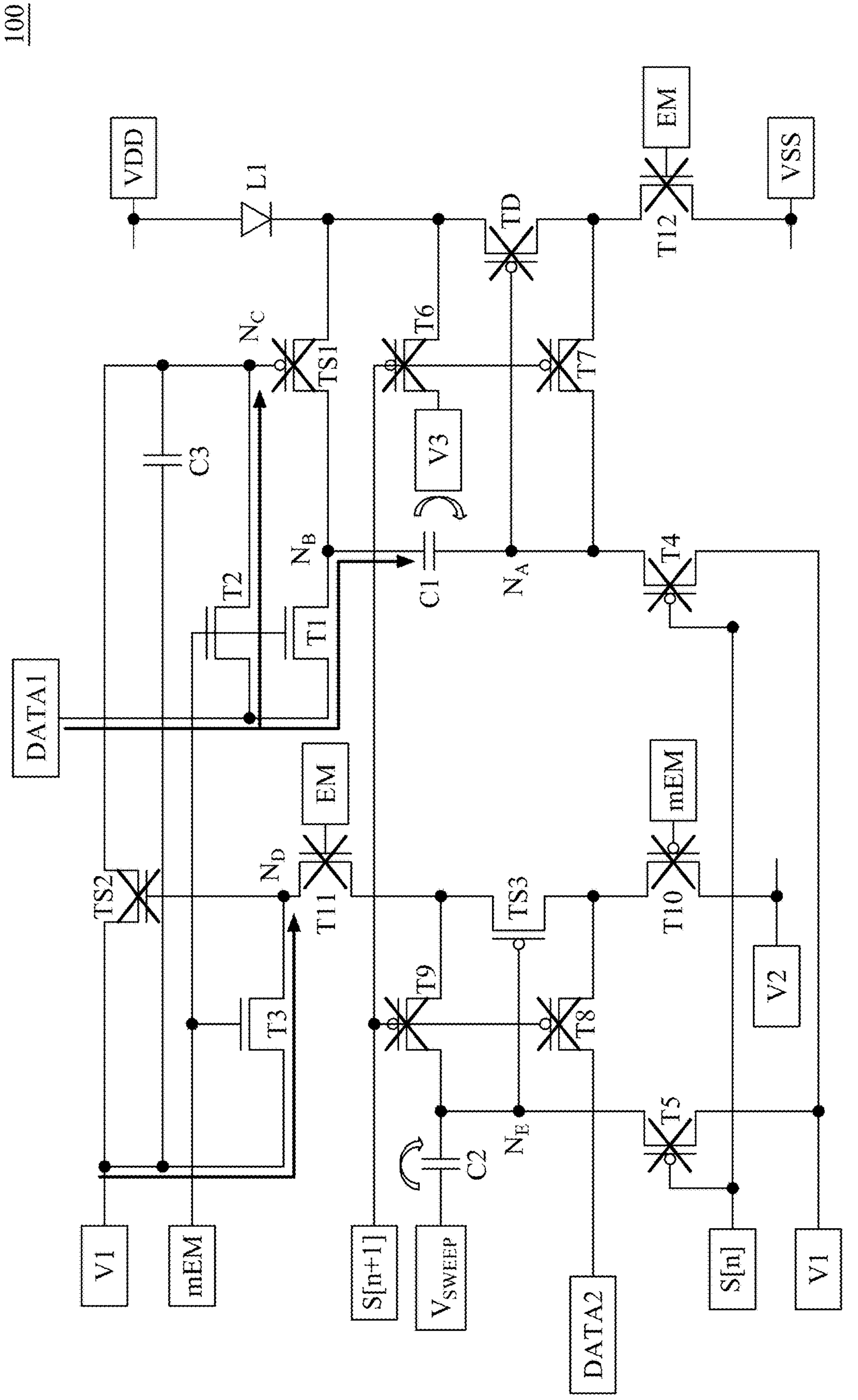
FIG. 4F depicts a schematic diagram of a driving circuit operates in an off period according to an embodiment of the present disclosure.

For better understanding that the overall operation of the driving circuit 100, a description is provided with reference to FIG. 2 to FIG. 4F. FIG. 4A depicts a schematic diagram of a driving circuit 100 operates in a reset period $P_{RES}$ according to an embodiment of the present disclosure. FIG. 4B depicts a schematic diagram of a driving circuit 100 operates in a compensation period $P_{COM}$ according to an embodiment of the present disclosure. FIG. 4C depicts a schematic diagram of a driving circuit 100 operates in a stabilization period $P_{STA}$ according to an embodiment of the present disclosure. FIG. 4D and FIG. 4E depict schematic diagrams of a driving circuit 100 operates in an emission period $P_{EM}$ according to an embodiment of the present disclosure. FIG. 4F depicts a schematic diagram of a driving circuit 100 operates in an off period $P_{OFF}$ according to an embodiment of the present disclosure.

To be noted that, in the embodiments of FIG. 2, FIG. 3 and FIG. 4A to FIG. 4F, the aforementioned transistors T1~T3 and T11~T12 are N-type transistors, and the aforementioned transistors T4~T10, the driving transistor TD and the switching transistors TS1~TS3 are P-type transistors. In the other embodiments the aforementioned transistors T1~T3 and T11~T12 can be implemented by P-type transistors, and the aforementioned transistors T4~T10, the driving transistor TD and the switching transistors TS1~TS3 can be implemented by N-type transistors. Therefore, it is not intend to limit the present disclosure. As shown in FIG. 4A, in the reset period $P_{RES}$, a control signal S[n] at a first logic level (such as, a low logic level) is applied to the gate terminals of the transistors T4 and T5, thereby closing a path through which a current flows from the gate terminal of the driving transistor TD and the gate terminal of the switching transistor TS3 to the reference voltage terminal V1, as such voltages at the gate terminals of the driving transistor TD and the switching transistor TS3 can be reset. In some embodiments, a multi-emission control signal mEM at a second logic level (such as, a high logic level) is applied to gate terminals of the transistors T1~T2, thereby closing a path through which a current flows from a data line of the data signal DATA1 to the gate terminal of the switching transistor TS1 and the second terminal of the capacitor C1, in order to stable a voltage at the second terminal of the capacitor C1 and a voltage at the gate terminal of the switching transistor TS1. In some embodiments, a multi-emission control signal mEM at the high logic level is applied to the gate terminal of the transistor T3, thereby closing a path through which a current flows from the gate terminal of the switching transistor TS2 to the reference voltage terminal V1, in order to stable a voltage at the gate terminal of the switching transistor TS2.

In the reset period $P_{RES}$, the multi-emission control signal mEM at the high logic level is applied to the gate terminal of the transistor T10, thereby turning off the transistor T10. And, the control signal S[n+1] at the high logic level is applied to the gate terminals of the transistors T6~T9, thereby turning of the transistors T6~T9. In some embodiments, the emission control signal EM at the low logic level is applied to the gate terminals of the transistor T11~T12, thereby turning off the transistors T11~T12.

In the reset period $P_{RES}$, voltages at a node $N_A$ (which is a connection of the gate terminal of the driving transistor TD and the first terminal of the capacitor C1), a node $N_D$ (which is a connection of the gate terminal of the switching transistor TS2 and the first terminal of the transistor T3) and a node $N_E$ (which is a connection of the gate terminal of the switching transistor TS3 and the second terminal of the capacitor C2) are substantially equal to a voltage of the reference voltage terminal V1. In the reset period $P_{RES}$, voltages at a node $N_B$ (which is a connection of the second terminal of the capacitor C1 and the first terminal of the transistor T1) and a node $N_C$ (which is a connection of the gate terminal of the switching transistor TS1 and the first terminal of the transistor T2) are substantially equal to a data voltage of the data signal DATA1.

To be noted that, in some embodiments, sort the voltages at the signal terminals and the voltage terminals of the driving circuit 100 in descending order as follows: the voltage data of the data signal DATA1, the voltage of the reference voltage terminal V3, the voltage of the driving terminal VDD, the voltage of the reference voltage terminal V2 and the voltage of the reference voltage terminal V1. That is, the voltage data of the data signal DATA1 is greater than the voltage of the voltage of the reference voltage terminal V1.

As shown in FIG. 4B, in the compensation period $P_{COM}$, the control signal S[n+1] at the low logic level is applied to the gate terminals of the transistors T6~T7, thereby turning the transistors T6~T7, as such a voltage of the reference voltage terminal V3 is transmitted through the transistor T6, the driving transistor TD and the transistor T7 to the gate terminal of the driving transistor TD, until the driving transistor TD is cut-off, resulting the compensation of the threshold voltage of the driving transistor TD. In the compensation period $P_{COM}$, the control signal S[n+1] at the low logic level is applied to the gate terminals of the transistors T8~T9, thereby turning on the transistors T8~T9, as such the data voltage of the data signal DATA2 is transmitted through the transistor T8, the switching transistor TS3 and the transistor T9 to the gate terminal of the switching transistor TS3, until the switching transistor TS3 is cut-off, resulting the compensation of the threshold voltage of the switching transistor TS3.

In some embodiments, in the compensation period $P_{COM}$, the multi-emission control signal mEM at the high logic level is applied to the gate terminals of the transistors T1~T2, as such the data voltage of the data signal DATA1 is transmitted to the second terminal of the capacitor C1 and the gate terminal of the switching transistor TS1, in order to stable voltages at the second terminal of the capacitor C1 and the gate terminal of the switching transistor TS1. In some embodiments, in the compensation period $P_{COM}$, the multi-emission control signal mEM at the high logic level is applied to the gate terminal of the transistor T3, thereby closing a path through which a current flows from the gate terminal of the switching transistor TS to the reference voltage terminal V1, in order to stable a voltage at the gate terminal of the switching transistor TS2.

In some embodiments, in the compensation period $P_{COM}$, the control signal S[n] at the high logic level is applied to the gate terminals of the transistors T4~T5, thereby turning off the transistors T4~T5. And, the multi-emission control signal mEM at the high logic level is applied to the gate terminal of the transistor T10, thereby turning off the transistor T10. In some embodiments, the emission control signal EM at the low logic level is applied to the gate terminals of the transistor T11~T12, thereby turning off the transistors T11~T12.

In the compensation period $P_{COM}$, voltages at the nodes $N_B$ and $N_C$ are substantially equal to the data voltage of the data signal DATA1, and a voltage at the nodes $N_D$ is substantially equal to a voltage of the reference voltage terminal V1. Voltages at the nodes $N_A$ and $N_E$ can be express by the following formulas.

$$V_{NA} = V3 - |V_{TH\_TD}|$$

$$V_{NE} = V_{DATA1} - |V_{TH\_TS3}|$$

In the above formulas, $V_{NA}$ refers to a voltage at the node $N_A$, $|V_{TH\_TD}|$ refers to an absolute value of the threshold voltage of the driving transistor TD. $V_{NE}$ refers to a voltage at the node $N_E$, $|V_{TH\_TS3}|$ refers to an absolute value of the threshold voltage of the switching transistor TS3, and $V_{DATA1}$ refers to the data voltage of the data signal DATA1. In some embodiments, V3 refers to the reference voltage terminal V3 or a voltage of the reference voltage terminal V3.

As shown in FIG. 4C, in the stabilization period $P_{STA}$, the multi-emission control signal mEM at the high logic level is applied to the gate terminals of the transistors T1~T2, in order to stable voltages at the second terminal of the capacitor C1 and the gate terminal of the switching transistor TS1. In some embodiments, in the stabilization period $P_{STA}$, the multi-emission control signal mEM at the high logic level is applied to the gate terminal of the transistor T3, and the emission control signal EM at the high logic level is applied to the gate terminal of the transistor T11, as such a voltage of the reference voltage terminal V1 is transmitted through the transistors T3 and T11 to the gate terminal of the switching transistor TS2 and the first terminal of the switching transistor TS3, in order to stable voltages at the gate terminal of the switching transistor TS2 and the first terminal of the switching transistor TS3.

In some embodiments, in the stabilization period $P_{STA}$, the emission control signal EM at the high logic level is applied to the gate terminal of the transistor T12, as such a voltage of the driving voltage terminal VSS is transmitted to the second terminal of the driving transistor TD. In some embodiments, the control signal S[n] at the high logic level is applied to the gate terminals of the transistors T4~T5, thereby turning off the transistors T4~T5. In some embodiments, the control signal S[n+1] at the high logic level is applied to the gate terminals of the transistors T6~T9, thereby turning off the transistors T6~T9. In some embodiments, in the stabilization period $P_{STA}$, the multi-emission control signal mEM at the high logic level is applied to the gate terminal of the transistor T10, thereby turning off the transistor T10.

In the stabilization period $P_{STA}$, a voltage at the node $N_A$ is substantially equal to a difference between the voltage of the reference voltage terminal V3 and the threshold voltage of the driving transistor TD. Voltages at the nodes $N_B$ and $N_C$ are substantially equal to the data voltage of the data signal DATA1. A voltage at the node $N_D$ is substantially equal to the voltage of the reference voltage terminal V1. A voltage at the node $N_E$ is substantially equal to a difference between the data voltage of the data signal DATA2 and the threshold voltage of the switching transistor TS3.

As shown in FIG. 4D, in the emission period $P_{EM}$, the emission control signal EM at the high logic level is applied to the gate terminals of the transistors T11~T12, thereby turning on the transistors T11~T12, and the multi-emission control signal mEM at the low logic level is applied to the gate terminal of the transistor T10, thereby turning on the transistor T10, as such the voltage of the reference voltage terminal V2 is transmitted through the transistor T10 to the second terminal of the switching transistor TS3.

In some embodiments, in the emission period $P_{EM}$, the control signal S[n] at the high logic level is applied to the gate terminals of the transistor T4~T5, thereby turning off the transistors T4~T5. The control signal S[n+1] at the high logic level is applied to the gate terminals of the transistors T6~T9, thereby turning off the transistors T6~T9. And, the multi-emission control signal mEM at the low logic level is applied to the transistors T1~T3, thereby turning off the transistors T1~T3.

At an initial of the emission period $P_{EM}$, a voltage at the node $N_A$ is substantially equal to a difference between the voltage of the reference voltage terminal V3 and the threshold voltage of the driving transistor TD. Voltages at the node $N_B$ and $N_C$ are substantially equal to the data voltage of the data signal DATA1. A voltage at the node $N_D$ is substantially equal to the voltage of the reference voltage terminal V1. Voltage at the node $N_E$ is substantially equal to a value which can be derived by subtracting a variation of the voltage of the sweep signal $V_{SWEEP}$ in the emission period $P_{EM}$ from a difference between the data voltage of the data signal DATA2 and the threshold voltage of the switching transistor TS3. In some embodiments, the voltage at the node $N_E$ in the emission period $P_{EM}$ is given by the following formula.

$$V_{NE} = V_{DATA2} - |V_{TH\_TS3}| - \Delta V_{SWEEP}$$

In above formula, $V_{NE}$ refers to a voltage at the node $N_E$, and $V_{DATA2}$ refers to the data voltage of the data signal DATA. $|V_{TH\_TS3}|$ refers to an absolute value of the threshold voltage of the switching transistor TS3, and $\Delta V_{SWEEP}$ refers to a variation of voltage at the gate terminal of the switching transistor TS3 based on the sweep signal $V_{SWEEP}$. In some embodiments, the variation of voltage at the gate terminal of the switching transistor TS3 can be considered as a variation of voltage of the sweep signal $V_{SWEEP}$. In some embodiments, a voltage of the sweep signal $V_{SWEEP}$ is linearly decreased in the emission period $P_{EM}$, thereby changing the voltage at the gate terminal of the switching transistor TS3 by the capacitive coupling of the capacitor C2.

In the emission period $P_{EM}$, a voltage across the second terminal (source terminal) of the switching transistor TS3 and the gate terminal of the switching transistor TS3 is given by the following formula.

$$V_{SG\_TS3} = V2 - (V_{DATA2} - |V_{TH\_TS3}| - \Delta V_{SWEEP})$$

In above formula, $V_{SG\_TS3}$ refers to a voltage across the source terminal and the gate terminal of the switching transistor TS3. In some embodiments, V2 in the present disclosure refers to the reference voltage terminal V2 or the voltage of the reference voltage terminal V2. In some embodiments, when the voltage across the source terminal and the gate terminal of the switching transistor TS3 is greater than the threshold voltage, the switching transistor TS3 is turned on, and the situation can is given by the following conditional expression.

$$V2 - (V_{DATA2} - |V_{TH\_TS3}| - \Delta V_{SWEEP}) > |V_{TH\_TS3}|$$

The following formula can be derived from the above formula.

$$\Delta V_{SWEEP} > V_{DATA2} - V2$$

That is, when a variation of the voltage at the gate terminal of the switching transistor TS3 based on the sweep signal $V_{SWEEP}$ is greater than a value of subtracting the voltage of the reference voltage terminal V2 from the data voltage of the data signal DATA2, the switching transistor TS3 is turned on. As a result, by setting the data voltage of the data signal DATA2, a point in time to turn on the switching transistor TS3 can be controlled. In some embodiments, since the voltage of the sweep signal $V_{SWEEP}$ is linearly decreased, if the data voltage of the data signal DATA2 is greater, there requires more time to achieve the said conditional expression, as such a point in time to turn on the switching transistor TS3 is later. As result, the brightness is controlled with the pulse width modulation by the driving circuit 100.

A description is provided with reference to FIG. 4E for illustrating the operation when the switching transistor TS3 is turned on in the emission period $P_{EM}$. As shown in FIG. 4E, when the switching transistor TS3 is turned on, the voltage of the reference voltage terminal V2 is transmitted through the transistor T10, the switching transistor TS3 and the transistor T11 to the gate terminal of the switching transistor TS2, thereby turning on the switching transistor TS2. When the switching transistor TS2 is turned on, the voltage of the reference voltage terminal V1 is transmitted through the switching transistor TS2 to the gate terminal of the switching transistor TS1, thereby turning on the switching transistor TS1.

When the switching transistor TS1 is turned on, the voltage of the driving voltage terminal VDD is transmitted through the light emitting element L1 and the switching transistor TS1 to the second terminal of the capacitor C1. Meanwhile, a variation of voltage at the node $N_B$ is given by the following formula.

$$\Delta V_{NB} = (VDD - V_{LED}) - V_{DATA1}$$

In above formula, $\Delta V_{NB}$ refers to the variation of voltage at the node $N_B$, and $V_{LED}$ refers to a voltage drop of the light emitting element L1. $V_{DATA1}$ refers to the data voltage of the data signal DATA1. In some embodiments, VDD refers to the voltage of the driving voltage terminal VDD or the driving voltage terminal VDD.

As a result, by capacitive coupling of the capacitor C1, the variation of voltage at the node $N_B$ is transferred to the gate terminal of the driving transistor TD. In some embodiments, voltages at the gate terminal (the node $N_A$) and the source terminal (the node $N_B$) of the driving transistor TD are given by the following formulas.

$$V_{NA} = (VDD - V_{LED}) - V_{DATA1} - (V3 - |V_{TH\_TD}|)$$

$$V_{NB} = (VDD - V_{LED})$$

Therefore, based on a voltage across the source terminal (the node $N_B$) and the gate terminal (the node $N_A$) of the driving transistor TD, the formula of the driving current is given by the following formula.

$$I_{LED} = K[V_{DATA1} - V3]$$

In above formula, $I_{LED}$ refers to the amplitude of the driving current, and K refers to coefficient associated to the characteristic of the driving transistor TD. From this, it can be seen that the threshold voltage of the switching transistor TS1 is removed from the factors which may influence the amplitude of the driving current, thereby compensating the threshold voltage of the switching transistor TS1. Further, the voltage of the driving voltage terminal VDD is removed from the factors which may influence the amplitude of the driving current, thereby compensating voltage drop that occurs in the driving voltage terminal VDD, as such the uniformity for the driving currents generated by the driving circuits included in the overall panel can be improved.

As shown in FIG. 4F, in the off period $P_{OFF}$, the multi-emission control signal mEM at the high logic level is applied to the gate terminals of the transistors T1~T3, thereby turning on the transistors T1~T3, in order to reset and/or stable voltages at the gate terminals of the switching transistors TS2 and TS1 and the second terminal of the capacitor C1. Further, the voltage of the sweep signal $V_{SWEEP}$ returns to an initial voltage, the variation that the voltage of the sweep signal $V_{SWEEP}$ returns to an initial voltage is transferred to the gate terminal of the switching transistor TS3 by capacitive coupling. A variation of the voltage at the second terminal of the capacitor C1 is transferred to the gate terminal of the driving transistor TD by capacitive coupling. In some embodiments, the control signal S[n] turns off the transistors T4~T5, and the control signal S[n+1] turns off the transistors T6~T9. In some embodiments, the emission control signal EM turns off the transistors T11~T12, and the multi-emission control signal mEM turns off the transistor T10.

In the off period $P_{OFF}$, a voltage at the node is substantially equal to a difference between the voltage of the reference voltage terminal V3 and the threshold voltage of the driving transistor TD. Voltages at the node $N_B$ and $N_C$ are substantially equal to the data voltage of the data signal DATA1. Voltage at the node $N_D$ is substantially equal to the voltage of the reference voltage terminal V1. Voltage at the node $N_E$ is substantially equal to a difference between the data voltage of the data signal DATA2 and the threshold voltage of the switching transistor TS3.

A description is provided with reference to FIG. 2 and FIG. 5A to FIG. 5D. FIG. 5A to FIG. 5D depict schematic diagrams of driving currents $I_{GL255}$, $I_{GL127}$ and $I_{GL127}$, a sweep signal $V_{SWEEP}$ and a multi-emission control signal mEM for a driving circuit 100 in a multi-emission period according to an embodiment of the present disclosure.

Figures 5A, 5B, 5C, 5D:
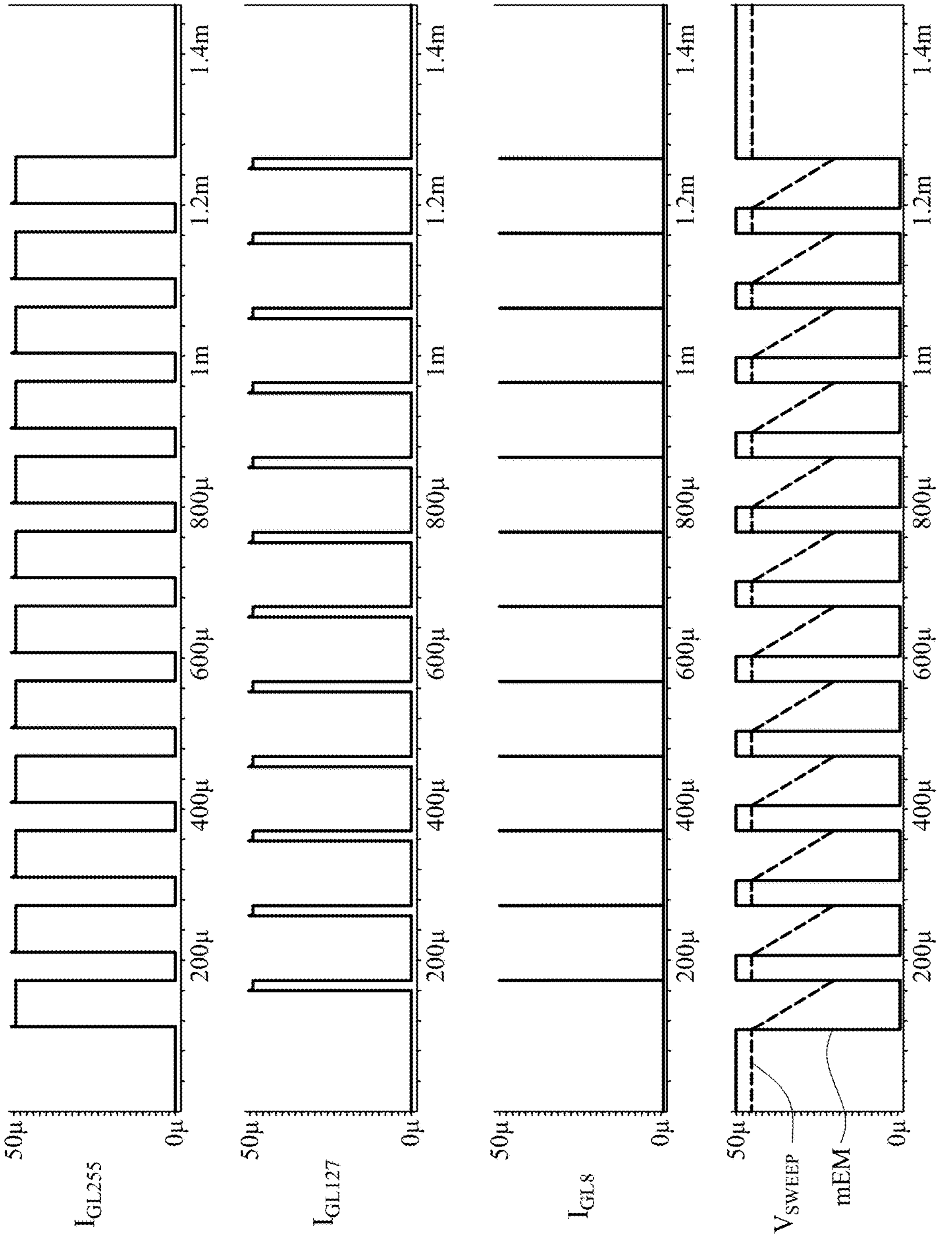
FIG. 5A to FIG. 5D depict schematic diagrams of driving currents, a sweep signal and a multi-emission control signal for a driving circuit in a multi-emission period according to an embodiment of the present disclosure.

As shown in FIG. 5D, a display cycle of the driving circuit 100 includes multiple emission periods, the said emission periods correspond to the time when the multi-emission control signal mEM at the low logic level. In some embodiments, the voltage of the sweep signal $V_{SWEEP}$ is linearly decreased in each emission period, and the voltage of the sweep signal $V_{SWEEP}$ returns to an initial voltage at the end of each emission period.

As shown in FIG. 5A to FIG. 5C, when the data voltage of the data signal DATA2 is respectively set according to the grayscale levels of 255, 127 and 8, the driving circuit 100 respectively generatesz the driving current $I_{GL255}$, $I_{GL127}$ and $I_{GL8}$ to drive the light emitting element L1. In some embodiments, a point in time that falling edges of the driving current $I_{GL255}$, $I_{GL127}$, and $I_{GL8}$ occur corresponds to a points in time that a falling edge of the multi-emission control signal mEM occurs, and the points in time that rising edges of the driving current $I_{GL255}$, $I_{GL127}$, and $I_{GL8}$ occur depend on the data voltages of the data signal DATA2, as such the rising edges of the driving current $I_{GL255}$, $I_{GL127}$, and $I_{GL8}$ occur in different points in time. As a result, the driving current $I_{GL255}$, $I_{GL127}$, and $I_{GL8}$ have different pulse widths, thereby implementing the grayscale dimming based on the pulsed width modulation.

Reference is made to the following Table 1 to illustrate the compensation effect for the threshold voltage of the driving transistor TD and the voltage drop occurs in the driving voltage terminal VDD.

TABLE 1

| $\Delta V_{TH\_TD}$ (V) | $\Delta V_{DD}$ (V) | $I_{LED}$ (μA) | error (%) |
|---|---|---|---|
| +0.3 | −0.5 | 48.815 | 1.46 |
| 0 | 0 | 49.54 | 0 |
| −0.3 | −0.5 | 48.637 | 1.82 |

As shown in Table 1, $\Delta V_{TH\_TD}$ refers to variation of the threshold voltage of the driving transistor TD. $\Delta V_{DD}$ refers to a voltage drop of the driving voltage terminal $V_{DD}$ received by the driving circuit 100. $I_{LED}$ refers to pulse amplitude of the driving current generated by the driving circuit 100. In some embodiments, under conditions that the voltage drop of the driving voltage terminal $V_{DD}$ is −0.5 volts and a variation of the threshold voltage of the driving transistor TD is +0.3 volts, an error between the amplitude (such as, 48.815 μA) of the driving current thereof and a normal driving current (such as, 49.54 μA) is 4.46%. In some embodiments, under conditions that the voltage drop of the driving voltage terminal $V_{DD}$ is −0.5 volts and a variation of the threshold voltage of the driving transistor TD is −0.3 volts, an error between the amplitude (such as, 48.637 μA) of the driving current thereof and a normal driving current (such as, 49.54 μA) is 1.82%. From this, it can be seen that, under conditions that the variation of the threshold voltage of the driving transistor TD is in a range of +0.3~−0.3 and the voltage drop of the driving voltage terminal VDD is −0.5 volts, the error of the amplitude of the driving current can be reduced to less than 1.9%. In other words, the architecture and the operation manner of the driving circuit can effectively compensate the variation of the threshold voltage of the driving transistor TD and the voltage drop of the driving voltage terminal VDD.

Figure 6:
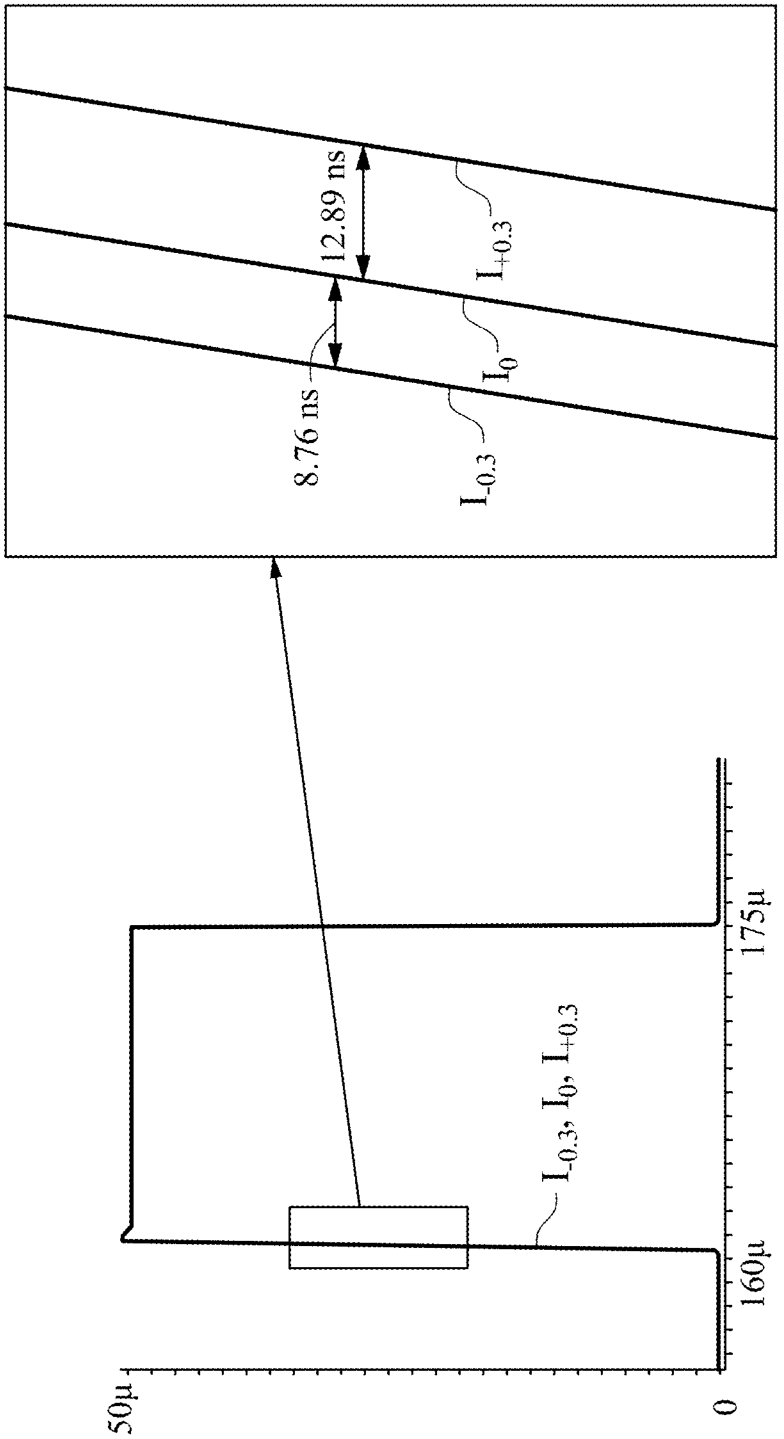
FIG. 6 depicts a schematic diagram of driving currents provided by a driving circuit under conditions that a threshold voltage of a switching transistor various according to an embodiment of the present disclosure.

A description is provided with reference to FIG. 6. FIG. 6 depicts a schematic diagram of driving currents provided by a driving circuit under conditions that a threshold voltage of a switching transistor TS3 various according to an embodiment of the present disclosure. As shown in FIG. 6, in some embodiments, under a condition that the variation of the threshold voltage of the switching transistor TS3 is +0.3 volts, the rising edge of the driving current $I_{+0.3}$ thereof is 12.89 nanoseconds later than the normal driving current $I_0$. In some embodiments, under a condition that the variation of the threshold voltage of the switching transistor TS3 is −0.3 volts, the rising edge of the driving current $I_{+0.3}$ thereof is 8.76 nanoseconds early than the normal driving current $I_0$. As a result, from the embodiments of FIG. 6, it can be seen that the driving circuit 100 can compensate the variation of the threshold voltage of the switching transistor TS3 quite well.

Figure 7A:
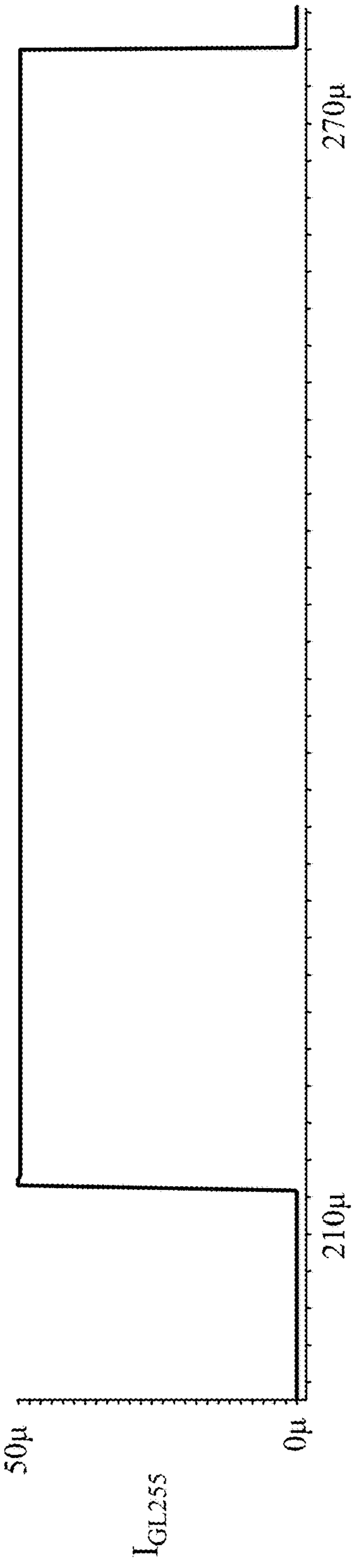
FIG. 7A to FIG. 7C respectively depict schematic diagrams of driving currents respectively provided by a driving circuit in a single emission period according to an embodiment of the present disclosure.
Figure 7B:
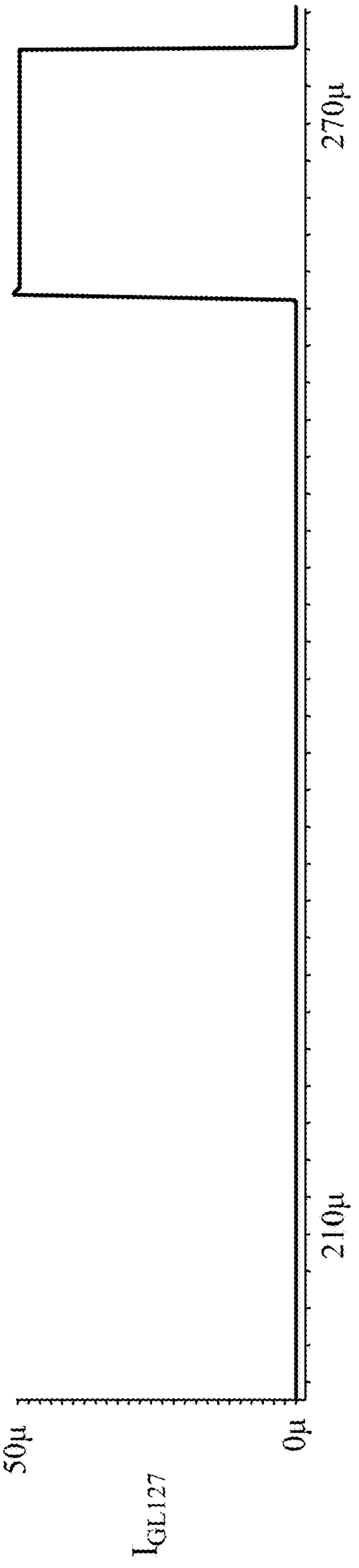
Figure 7C:
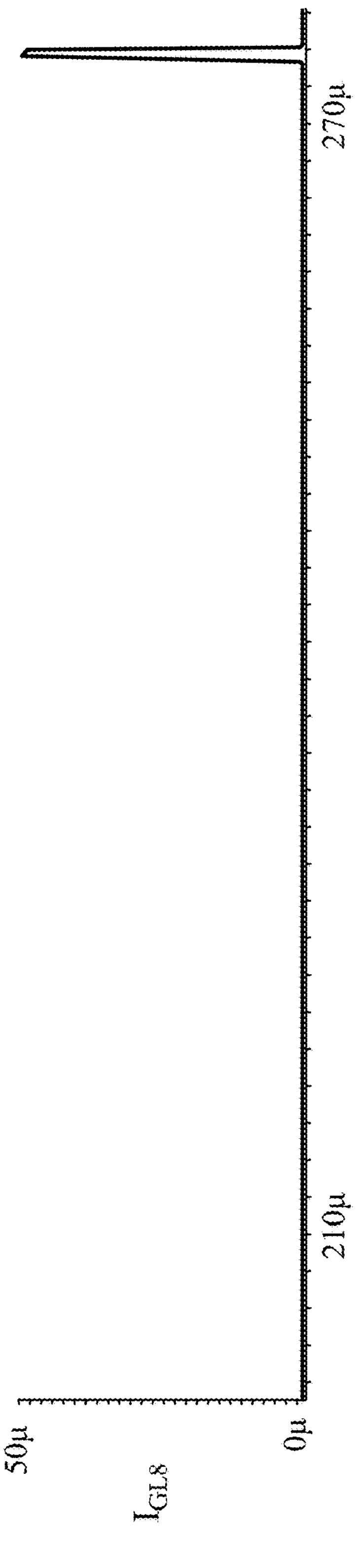

A description is provided with reference to FIG. 7A to FIG. 7C. FIG. 7A to FIG. 7C respectively depict schematic diagrams of driving currents $I_{GL255}$, $I_{GL127}$, and $I_{GL8}$ respectively provided by a driving circuit 100 in a single emission period according to an embodiment of the present disclosure. In some embodiments, when the data voltage (such as, 5 volts) of the data signal DATA2 is set according to the grayscale level of 255, the rise time of the driving current $I_{GL255}$ is 0.213 nanoseconds. In some embodiments, when the data voltage (such as, 12.1 volts) of the data signal DATA2 is set according to the grayscale level of 127, the rise time of the driving current $I_{GL127}$ is 0.206 nanoseconds. In some embodiments, when the data voltage (such as, 14 volts) of the data signal DATA2 is set according to the grayscale level of 8, the rise time of the driving current $I_{GL8}$ is 0.203 nanoseconds. From the embodiments of FIG. 7A to FIG. 7C, it can be seen that, the driving circuit 100 can greatly improve the rise time of the driving current, thereby controlling the grayscale better, as such the light emitting element L1 can operate in the best emission efficiency point at every grayscale levels.

Summary, the driving circuit 100 utilizes two-stage path to turn on the switching transistor TS1, in order to reduce the transition time (the rise time) of the driving current by the fast rising mechanism, as such the intensity of grayscale can be controlled precisely. The present disclosure provides the compensation for the voltage drop of the driving voltage terminal VDD, such that the driving circuit 100 is capable for application in the splicing screen, resulting in the increasing in the overall uniformity. The driving circuit 100 of the present disclosure can effectively compensate the threshold voltages of the driving transistor TD and the switching transistor TS3, resulting in the uniformity of driving currents.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A driving circuit, comprising:

a driving transistor, electrically coupled between a first driving voltage terminal and a second driving voltage terminal, and the driving transistor is configured to control a driving current provided to a light emitting element;

a first capacitor, with a first terminal electrically coupled to a gate terminal of the driving transistor;

a first switching transistor, with a first terminal electrically coupled to a first terminal of the driving transistor, with a second terminal electrically coupled to a second terminal of the first capacitor;

a second switching transistor, with a first terminal electrically coupled to a gate terminal of the first switching transistor, with a second terminal electrically coupled a first reference voltage terminal;

a third switching transistor, electrically coupled between a gate terminal of the second switching transistor and a second reference voltage terminal; and a second capacitor, with a first terminal electrically coupled to a gate terminal of the third switching transistor, with a second terminal configured to receive a sweep signal.

2. The driving circuit of claim 1, wherein the third switching transistor is turned on according to a variation of the sweep signal, to transmit a voltage at the second reference voltage terminal to the gate terminal of the second switching transistor, and wherein the second switching transistor is turned on according to the voltage at the second reference voltage terminal, to transmit a voltage at the first reference voltage terminal to the gate terminal of the first switching transistor.

3. The driving circuit of claim 1, wherein the first switching transistor is turned on according to a voltage at the first reference voltage terminal, to conduct a current from the first driving voltage terminal to the second terminal of the first capacitor, as such a voltage at the second terminal of the first capacitor is variated according to the voltage at the first reference voltage terminal, and wherein a variation of the voltage at the second terminal of the first capacitor changes a voltage at the gate terminal of the driving transistor by capacitive coupling effect, to turn on the driving transistor.

4. The driving circuit of claim 1, further comprising:

a data setting circuit, electrically coupled to the second terminal of the first capacitor, and the data setting circuit is configured to transmit a first data signal to the second terminal of the first capacitor;

a first stabilization circuit, electrically coupled to the gate terminal of the first switching transistor, and the first stabilization circuit is configured to stable a voltage at the gate terminal of the first switching transistor; and a second stabilization circuit, electrically coupled to the gate terminal of the second switching transistor, and the second stabilization circuit is configured to stable a voltage at the gate terminal of the second switching transistor.

5. The driving circuit of claim 4, wherein:

the data setting circuit comprises:

a first transistor, with a first terminal electrically coupled to the second terminal of the first capacitor, with a second terminal configured to receive the first data signal, with a gate terminal configured to receive a multi-emission control signal;

the first stabilization circuit comprises:

a second transistor, with a first terminal electrically coupled to the gate terminal of the first switching transistor, with a second terminal configured to receive the first data signal, with a gate terminal configured to receive the multi-emission control signal; and the second stabilization circuit comprises:

a third transistor, with a first terminal electrically coupled to the gate terminal of the second switching transistor, with a second terminal electrically coupled to the first reference voltage terminal, with a gate terminal configured to receive the multi-emission control signal.

6. The driving circuit of claim 1, further comprising:

a first reset circuit, electrically coupled to the gate terminal of the driving transistor, and the first reset circuit is configured to reset the driving transistor; and a second reset circuit, electrically coupled to the gate terminal of the third switching transistor, and the second reset circuit is configured to reset the third switching transistor.

7. The driving circuit of claim 6, wherein:

the first reset circuit comprises:

a fourth transistor, with a first terminal electrically coupled to the gate terminal of the driving transistor, with a second terminal electrically coupled to the first reference voltage terminal, with a gate terminal configured to receive a first control signal; and the second reset circuit comprises:

a fifth transistor, with a first terminal electrically coupled to the gate terminal of the third switching transistor, with a second terminal electrically coupled to the first reference voltage terminal, with a gate terminal configured to receive the first control signal.

8. The driving circuit of claim 1, further comprising:

a first compensation circuit, electrically coupled to the gate terminal of the driving transistor, and the first compensation circuit is configured to compensate a threshold voltage of the driving transistor; and a second compensation circuit, electrically coupled the gate terminal of the third switching transistor, and the second compensation circuit is configured to compensate a threshold voltage of the third switching transistor.

9. The driving circuit of claim 8, wherein:

the first compensation circuit comprises:

a sixth transistor, with a first terminal electrically coupled to the first terminal of the driving transistor, with a second terminal electrically coupled to a third reference voltage terminal, with a gate terminal configured to receive a second control signal; and a seventh transistor, with a first terminal electrically coupled to a second terminal of the driving transistor, with a second terminal electrically coupled to the gate terminal of the driving transistor, with a gate terminal configured to receive the second control signal; and the second compensation circuit comprises:

an eighth transistor, with a first terminal electrically coupled to a second terminal of the third switching transistor, with a second terminal configured to receive a second data signal, with a gate terminal configured to receive the second control signal; and a ninth transistor, with a first terminal electrically coupled a first terminal of the third switching transistor, with a second terminal electrically coupled to the gate terminal of the third switching transistor, with a gate terminal configured to receive the second control signal.

10. The driving circuit of claim 1, further comprising:

a tenth transistor, with a first terminal electrically coupled a second terminal of the third switching transistor, with a second terminal electrically coupled to the second reference voltage terminal, with a gate terminal configured to receive a multi-emission control signal;

an eleventh transistor, with a first terminal electrically coupled to the gate terminal of the second switching transistor, with a second terminal electrically coupled to a first terminal of the third switching transistor, with a gate terminal configured to receive an emission control signal;

a twelfth transistor, with a first terminal electrically coupled to a second terminal of the driving transistor, with a second terminal electrically coupled to the second driving voltage terminal, with a gate terminal configured to receive the emission control signal; and a third capacitor, with a first terminal electrically coupled to the gate terminal of the first switching transistor, with a first terminal electrically coupled to the first reference voltage terminal.

11. A driving circuit, comprising:

a driving transistor, electrically coupled between a first driving voltage terminal and a second driving voltage terminal, and the driving transistor is configured to control a driving current provided to a light emitting element;

a first switching transistor and a first capacitor electrically connected in series between the first driving voltage terminal and a gate terminal of the driving transistor;

a second switching transistor, with a first terminal electrically coupled to a gate terminal of the first switching transistor, with a second terminal electrically coupled a first reference voltage terminal;

a third switching transistor, electrically coupled between a gate terminal of the second switching transistor and a second reference voltage terminal; and a second capacitor, with a first terminal electrically coupled to a gate terminal of the third switching transistor, with a second terminal configured to receive a sweep signal.

12. A driving circuit, comprising:

a driving transistor, electrically coupled between a first driving voltage terminal and a second driving voltage terminal, and the driving transistor is configured to control a driving current provided to a light emitting element;

a first capacitor, with a first terminal electrically coupled to a gate terminal of the driving transistor;

a first switching transistor, electrically coupled between a second terminal of the first capacitor and the first driving voltage terminal;

a second switching transistor, electrically coupled between a gate terminal of the first switching transistor and a first reference voltage terminal;

a third switching transistor, electrically coupled between a gate terminal of the second switching transistor and a second reference voltage terminal; and a second capacitor, with a first terminal electrically coupled to a gate terminal of the third switching transistor, with a second terminal configured to receive a sweep signal.

13. The driving circuit of claim 12, further comprising a data setting circuit, electrically coupled to the second terminal of the first capacitor, and the data setting circuit is configured to transmit a first data signal to the second terminal of the first capacitor.

14. The driving circuit of claim 13, wherein the data setting circuit comprises:

a first transistor, with a first terminal electrically coupled to the second terminal of the first capacitor, with a second terminal configured to receive the first data signal, with a gate terminal configured to receive a multi-emission control signal.

15. The driving circuit of claim 12, further comprising a first stabilization circuit, electrically coupled to the gate terminal of the first switching transistor, and the first stabilization circuit is configured to stable a voltage at the gate terminal of the first switching transistor.

16. The driving circuit of claim 15, wherein the first stabilization circuit comprises:

a second transistor, with a first terminal electrically coupled to the gate terminal of the first switching transistor, with a second terminal configured to receive a first data signal, with a gate terminal configured to receive a multi-emission control signal.

17. The driving circuit of claim 12, further comprising a second stabilization circuit, electrically coupled to the gate terminal of the second switching transistor, and the second stabilization circuit is configured to stable a voltage at the gate terminal of the second switching transistor.

18. The driving circuit of claim 17, wherein the second stabilization circuit comprises:

a third transistor, with a first terminal electrically coupled to the gate terminal of the second switching transistor, with a second terminal electrically coupled to the first reference voltage terminal, with a gate terminal configured to receive a multi-emission control signal.

19. The driving circuit of claim 12, further comprising:

a first reset circuit, electrically coupled to the gate terminal of the driving transistor, and the first reset circuit is configured to reset the driving transistor; and a second reset circuit, electrically coupled to the gate terminal of the third switching transistor, and the second reset circuit is configured to reset the third switching transistor.

20. The driving circuit of claim 12, further comprising:

a first compensation circuit, electrically coupled to the gate terminal of the driving transistor, and the first compensation circuit is configured to compensate a threshold voltage of the driving transistor; and a second compensation circuit, electrically coupled the gate terminal of the third switching transistor, and the second compensation circuit is configured to compensate a threshold voltage of the third switching transistor.

* * * * *